(12) United States Patent
Hoglund et al.

(10) Patent No.: US 9,048,652 B2
(45) Date of Patent: Jun. 2, 2015

(54) CABLE TERMINATION DEVICE, A METHOD FOR PREFABRICATING A CABLE TERMINATION DEVICE AND A METHOD FOR ACHIEVING A CABLE TERMINATION

(71) Applicants: Mikael Hoglund, Alingsas (SE); Leif Johansson, Alingsas (SE)

(72) Inventors: Mikael Hoglund, Alingsas (SE); Leif Johansson, Alingsas (SE)

(73) Assignee: ABB TECHNOLOGY AG (CH)

( * ) Notice: Subject to any disclaimer, the term of this patent is extended or adjusted under 35 U.S.C. 154(b) by 0 days.

(21) Appl. No.: 14/080,074

(22) Filed: Nov. 14, 2013

(65) Prior Publication Data

US 2014/0069679 A1 Mar. 13, 2014

Related U.S. Application Data

(63) Continuation of application No. PCT/EP2011/066513, filed on Sep. 22, 2011.

(60) Provisional application No. 61/488,186, filed on May 20, 2011.

(51) Int. Cl.
*H02G 15/02* (2006.01)
*H02G 15/04* (2006.01)
(Continued)

(52) U.S. Cl.
CPC .............. *H02G 15/02* (2013.01); *Y10T 29/4922* (2015.01); *H02G 15/046* (2013.01); *H02G 15/064* (2013.01); *H02G 1/14* (2013.01)

(58) Field of Classification Search
CPC ....... H02G 15/02; H02G 15/04; H02G 15/05; H02G 15/06; H02G 15/10; H02G 15/68; H02G 15/184; H02G 15/46; H02G 15/64; H02G 15/103; H02G 15/105; H02G 15/00–15/22

USPC ...... 174/73.1, 74 R, 80, 93, 138 F, 154, 75 R, 174/75 D, 76, 78, 79, 82, 84 R, 85, 86, 88 C, 174/88 S, 89, 167, 168, 169, 176
See application file for complete search history.

(56) References Cited

U.S. PATENT DOCUMENTS 3,883,680 A * 5/1975 Keen, Jr. ................. 174/12 BH
5,130,495 A 7/1992 Thompson
(Continued)

FOREIGN PATENT DOCUMENTS

| CN | 2790001 Y | 6/2006 |
| DE | 1051354 B | 2/1959 |
| EP | 1170846 A1 | 1/2002 |

OTHER PUBLICATIONS

International Search Report and Written Opinion of the International Searching Authority Application No. PCT/EP2011/066513 Completed: May 22, 2013; Mailing Date: May 29, 2013 8 pages.

*Primary Examiner* — Ishwarbhai B. Patel
*Assistant Examiner* — Paresh Paghadal
(74) *Attorney, Agent, or Firm* — St. Onge Steward Johnston & Reens LLC

(57) ABSTRACT

A cable termination device of the dry type, including an insulator housing with an upper end and a lower end and having a hollow interior, which lower end has an opening for insertion of the cable. The device further includes a stress controller device located inside the insulator housing and adapted to be mounted on a high voltage cable, and an electrically insulating gel filling at least part of the hollow interior of the insulator housing and surrounding at least part of the stress controller device. Further, the stress controller device extends from the lower end of the insulator housing and into the housing where it has a free end, whereby a space is formed between the stress controller device and an inner wall of the insulator housing.

13 Claims, 4 Drawing Sheets

(51) Int. Cl.
*H02G 15/064* (2006.01)
*H02G 1/14* (2006.01)

(56) References Cited

U.S. PATENT DOCUMENTS

| | | | | |
|---|---|---|---|---|
| 5,406,030 | A * | 4/1995 | Boggs | 174/73.1 |
| 6,235,992 | B1 * | 5/2001 | Abisso et al. | 174/110 S |
| 6,501,024 | B1 * | 12/2002 | Evans | 174/76 |
| 8,525,025 | B2 * | 9/2013 | Li et al. | 174/73.1 |
| 2006/0124339 | A1 * | 6/2006 | Goehlich | 174/74 R |
| 2008/0029289 | A1 * | 2/2008 | Amerpohl | 174/73.1 |
| 2010/0200274 | A1 * | 8/2010 | Jonsson et al. | 174/137 B |
| 2011/0114358 | A1 * | 5/2011 | Takayasu et al. | 174/73.1 |
| 2012/0193142 | A1 * | 8/2012 | Mori et al. | 174/75 R |

* cited by examiner

CABLE TERMINATION DEVICE, A METHOD FOR PREFABRICATING A CABLE TERMINATION DEVICE AND A METHOD FOR ACHIEVING A CABLE TERMINATION

FIELD OF THE INVENTION

The present invention relates to a cable termination device of the dry type, and a method for prefabricating such a cable termination device. It also relates to a method for achieving a cable termination on a cable, such as a high voltage cable. In particular, the present invention relates to terminations for electric cables used for electric power distribution.

BACKGROUND OF THE INVENTION

Cables used for electric power distribution are typically operated at thousands of volts, and consequently care must be taken when terminating these cables and connecting them to electrical components, e.g. switchgear units. At the point where the cable is terminated electrical stress occurs that needs to be controlled.

The cable termination typically requires that various dielectric, insulation, semi-conducting and conductive shield layers that surrounds the central current carrying conductor are removed, and that the various semi-conducting and conducting surrounding layers are appropriately connected to the involved electrical equipment. In particular, electric stress occurs at sudden changes in the cable shielding system, e.g. where a semi-conducting outer layer is cut away.

A cable termination for medium and high voltages is normally an insulator comprising a housing inside which is located a stress control device mounted on the cable. The insulator housing is usually of porcelain or a composite. The function of the stress control device is to control the electric field, e.g. where an outer semi-conducting layer is cut away. The stress control device is often cone-shaped, and referred to as a stress cone. The housing is filled with an electrical insulation medium. This insulation medium is traditionally oil, in which case the cable termination device is referred to as being of the wet type. The cable termination device may alternatively be of the so called dry type, for example when the insulation material is an elastomeric compound as in U.S. Pat. No. 5,130,495, or a gel of some suitable kind, e.g. a polymer or silicone gel.

Traditionally, the different parts of the cable termination device are assembled at the end site and mounted on the cable. The device is then raised in an upright position. Finally, the electrical insulating medium, such as oil, is filled into the insulator housing and the housing is then sealed by mounting of the top end cap and the external electrical connection.

The assembling work at site is a time consuming procedure with a medium such as oil that is unfriendly to the environment. There are risks involved, for example if the cable termination should explode the damage would be severe with burning oil.

The existing dry types of cable termination devices have the main drawback of being expensive.

SUMMARY OF THE INVENTION

An object of the present invention is to provide a cable termination device of the dry type, for terminating a cable including a high voltage current-carrying conductor, and which cable termination device may be prefabricated and then transported to a final site where it is installed on a cable in a simple and safe manner. Another object is to provide a method for prefabricating such a cable termination device. By the used term "high voltage" is referred to electric voltages of 36 kV and above, and often much higher such as hundreds of kilo volt.

The object of the present invention is achieved by a cable termination device and by a method for prefabricating and further by a method for achieving a cable termination.

Accordingly is defined a cable termination device of the dry type, for terminating a high voltage cable, comprising an insulator housing with an upper end and a lower end and having a hollow interior, which lower end has an opening for insertion of the cable, further comprising a stress controller device located inside the insulator housing, and adapted to be mounted on a high voltage cable, and an electrically insulating gel filling at least part of the hollow interior of the insulator housing and surrounding at least part of the stress controller device, characterised in that the stress controller device is mounted at the lower end of the insulator housing and extends from the lower end of the insulator housing and into the housing where it has a free end, whereby a space is formed between the stress controller device and an inner wall of the insulator housing, and that said space is filled with insulating gel up to a level which is below the free end of the stress controller device inside the insulator housing.

Through this invention is achieved the advantage that the cable termination device may be prefabricated, including the filling of the device with an insulating medium. The insulating medium inside the device is a gel that may be in such a viscous form initially that it may be poured into the insulator housing when the device is in an upright position, and which will then form a gel after a short period of time, thus allowing the entire device to be handled and stored without any consideration to if it is upright, or lying on its side etc. Consequently, the prefabricated device may be easily transported to its final site. The level of insulating gel needs only to be high enough to surround the major part of the stress controller device, and consequently there are savings to be made compared to filling the entire insulator housing with insulating medium. Examples of insulating gel is polymer based insulating gel, silicone gel, or any other type of suitable gel that can be in liquid form in order to be poured into the insulator housing, where it will then change or be made to change into gel form.

The dry type of cable termination device according to the present invention also has the advantage of a simpler, safer and quicker installation, since no insulating medium has to be poured into the device at the installation site, it is a more environmental friendly product and in case of failure there is less risk of causing damage to the surrounding environment. For example, if there should be an explosion, the insulating gel is close to harmless compared to oil.

The cable termination device according to the present invention does not necessarily have to be installed in a vertically upright position, but may also be installed at an angle to the vertical plane, up to an approximate maximum of 45°.

According to one feature, the stress controller device has a length extending inside the insulator housing that is shorter than the length of the hollow interior of the insulator housing. This allows for saving on insulating gel, and it will also be easier to insert the cable into the stress controller device and all the way up to the end cap and top connection of the device when the upper part of the interior of the device is not filled with insulating gel. Preferably, the stress controller device is considerably shorter than the length of the hollow interior of the insulator housing, e.g. approximately half its length, or two thirds.

According to a further feature, the stress controller device comprises a stress control member and a support pipe and the stress control member is mounted to the insulator housing by means of the support pipe. The advantage of using a support pipe and mounting the stress control member, i.e. the member that performs the stress control function, on the support pipe is that the stress control member will be located higher up in the insulator housing which will result in a better stress control function. The support pipe also keeps the internal part of the insulator housing that is below the stress control member free from insulating gel and therefore facilitates the insertion of the cable into the housing and into the stress control member. The stress control member may have a conical shape, as is common.

Furthermore, the stress controller device is provided with a deflector arrangement. This forms part of the stress control member and is the functional part that is in contact with the outer semi-conducting or conducting layer of the cable.

According to another embodiment, the cable termination device may have a stress controller device that comprises a stress control member of a conical shape wherein a truncated top of the conical stress control member is provided with a pipe shaped extension, which pipe shaped extension has a free end constituting said free end of the stress controller device. The pipe-shaped extension of the stress control member makes it possible to fill insulating gel higher up.

According to an alternative embodiment, the stress controller device may comprise a stress control member of a conical shape and the stress controller device may further comprises a pipe shaped extension member mounted on a truncated top of the conical stress control member, which pipe shaped extension member has a free end constituting said free end of the stress controller device. According to this alternative the pipe-shaped extension of the stress control member is a separate part that can be optionally mounted on a conical stress control member.

According to another feature, the cable termination device may be self supporting, which makes it easier to handle, transport and install.

The stress controller device and the surrounding electrically insulating gel may also form a compressible unit which can adapt to different cable diameters. Generally, the compressibility will also facilitate the insertion of the cable into the stress controller device and the entire device.

According to yet another feature is defined that the cable termination device according to the present invention may be prefabricated, before installation on the cable.

According to the present invention is also defined a method for prefabricating a cable termination device for a high voltage cable, comprising:
mounting a stress controller device, having a hollow interior adapted for insertion of a cable, inside a hollow interior of an insulator housing, by mounting the stress controller device to a lower end of the insulator housing, said lower end having an opening for insertion of a cable into the insulator housing,
filling an electrically insulating gel into the insulator housing in a space formed between the stress controller device and an inner wall of insulator housing, such that part of the stress controller device is surrounded by insulating gel, and to a level where the insulating gel is below a free end of the stress controller device inside the insulator housing.

This method offers advantages corresponding to the advantages already described above.

The inventive method may further be characterized by mounting a stress control member on a support pipe thereby forming the stress controller device, and mounting the stress control member by means of the support pipe to the insulator housing.

According to another feature, a pipe shaped extension member may be mounted on a truncated top of a conical stress control member, which pipe shaped extension member has a free end constituting said free end of the stress controller device.

According to another aspect of the invention is defined a method for achieving a cable termination on a high voltage cable, comprising installation of a prefabricated cable termination device on a high voltage cable.

To summarize, through the present invention is obtained the advantages of a cable termination device that is dry both before and after installation on the cable, and a cable termination device that is prefabricated and totally ready to be installed on the cable when it arrives on the installation site, in other words a cable termination device of a "plug and play" type. Furthermore, the cable termination device can be used on cables having differing diameters.

BRIEF DESCRIPTION OF THE DRAWINGS

The invention will now be described in more detail, with reference being made to the enclosed schematic drawings illustrating different aspects and embodiments of the invention, given as examples only, and in which.

In the drawings, the same elements or corresponding elements in the different embodiments have been given the same reference number.

DETAILED DESCRIPTION OF THE INVENTION

Figure 1:
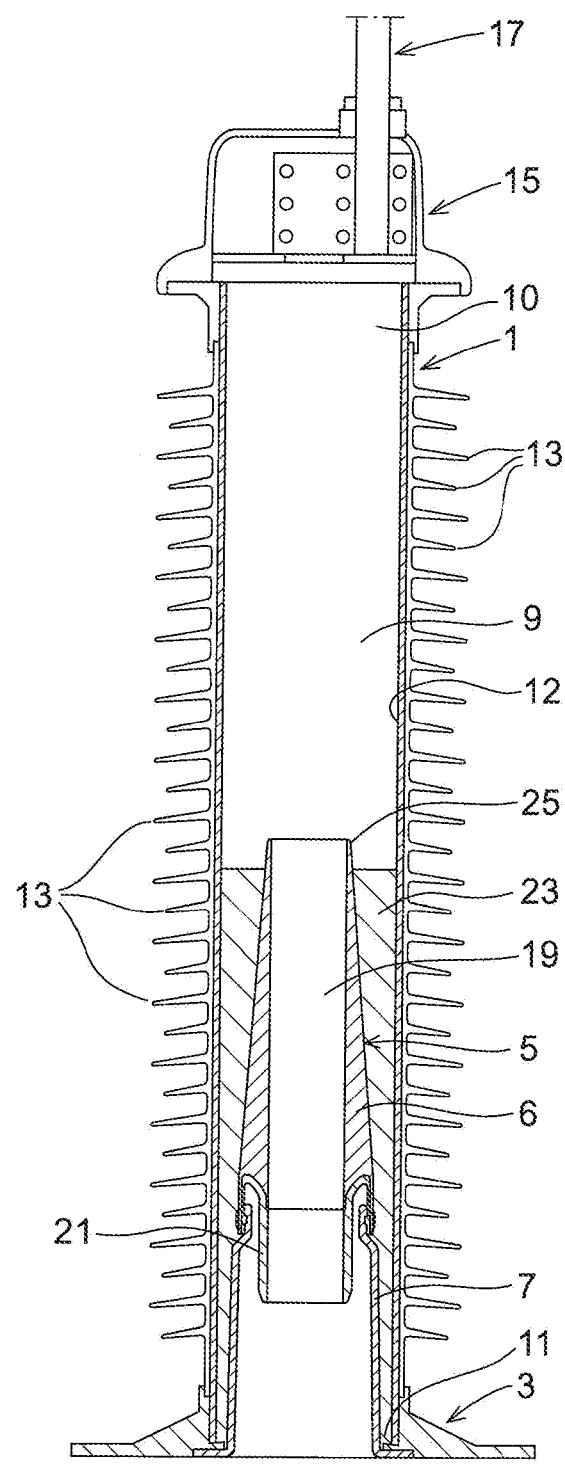
FIG. 1 shows schematically an embodiment of a cable termination device according to the present invention, partially in cross section.

The cable termination device, according to the present invention, of which an embodiment is shown in FIG. 1, comprises an insulator housing 1 including a base member 3, and a stress controller device 5. The stress controller device in the illustrated example comprises a stress control member or stress cone 6, and an intermediate support pipe 7. The stress control member 6 is mounted on the intermediate support pipe 7, which in turn is mounted on the base member 3 of the insulator housing 1. The stress controller device 5 is located inside the insulator housing 1. The insulator housing 1 has a hollow interior 9, and it has two open ends, an upper end 10 and a lower end 11. Usually, the shape of the insulator housing is basically cylindrical, with a central bore 12 forming an inner wall of the insulator housing, sometimes with a tapering at one or both ends. The insulator housing is provided with a series of skirts 13 on its external surface and outwardly extending therefrom. Preferably the insulator housing is rigid and made of glass fibre, epoxy, silicone, a polymer, porcelain, rubber or any other material normally used for this type of device. The insulator housing may also have a core made of one material, e.g. glass fibre reinforced epoxy, and the skirts 13 may be made of a different material, e.g. silicone. At the upper end 10, the insulator housing is sealed with an end cap 15, provided with an external electric connection 17 to which an inner conductor of the cable is connected.

The stress controller device 5 is mounted inside the hollow interior 9 of the insulator housing 1 by means of the support pipe 7 being mounted at the lower end 11 of the insulator housing, where the base member 3 of the housing is located. The stress controller device 5 extends from the lower end 11 and into the insulator housing and it has a length that is shorter than the hollow interior 9 of the insulator housing 1, i.e. it does not stretch all the way up to the end cap 15. The reason is that the longer the stress control member 6 is, the more difficult it will be to insert the cable, and therefore the stress control member 6 should not be made longer than is necessary to obtain the required control of the electric fields. The upper end 25 of the stress controller device is a free end in the meaning that it is not attached per se to the insulator housing, thus it is a free end in relation to the insulator housing 1.

Figure 2:
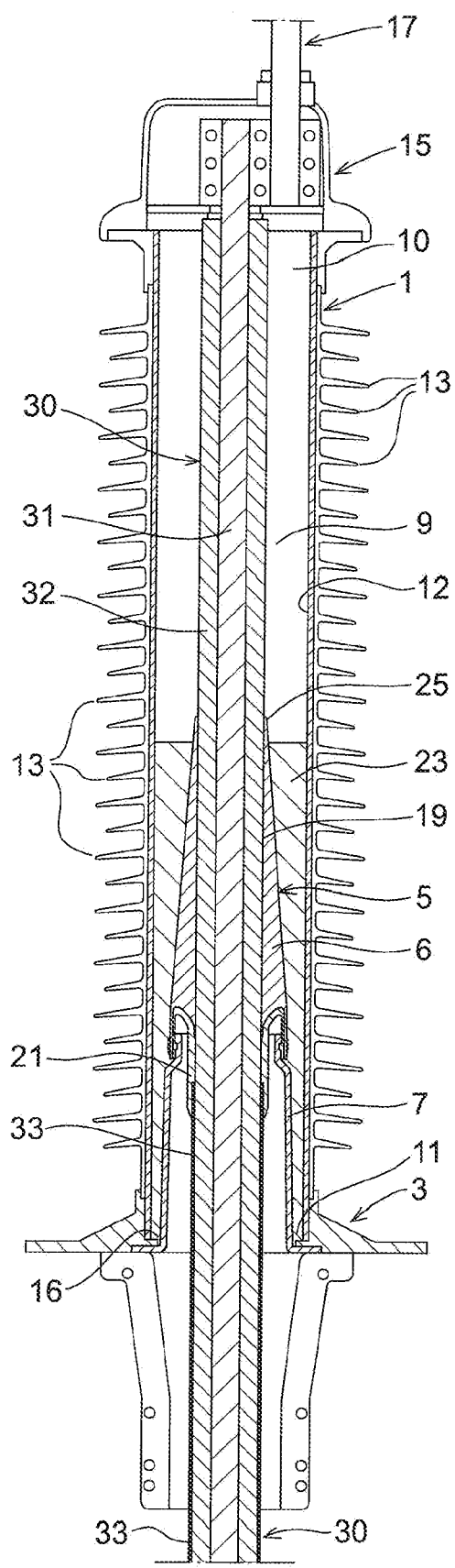
FIG. 2 illustrates schematically the cable termination device of FIG. 1, in cross section, when installed on a cable.

An example of a cable 30, see FIG. 2, for which the inventive cable termination device may be used, is a high voltage cable of the XLPE type, having an inner conductor 31 surrounded by an insulation layer 32 of XLPE, and an outer conductive or semi-conductive layer 33. Before the cable is inserted into the cable termination device, the cable end is prepared by peeling off the outer conductive or semi-conductive layer 33 such that the cable end extending from the stress controller device 5 up to the end cap 15 is free of this layer.

In the illustrated example, the stress control member 6 has a conical external shape, which facilitates insertion of a cable. However, it may also have a more cylindrical shape, for example. Inside the stress control member is provided a central bore 19 adapted to receive a cable. The stress control member 6 is preferably of a polymer material, rubber or similar which is at least somewhat resilient. The function of the stress control member is to control and reduce the electric field and minimize electric stress generated at the cable termination. The stress control member is provided with a deflector arrangement 21 at its lower end, where the cable is inserted, and which will surround the cable. The deflector arrangement 21 has the function of controlling and reducing the electric field and minimizing electric stress occurring in the region where the outer conductive or semi-conductive layer of the cable is removed, as explained above.

The support pipe 7 has the function of making it possible for the stress control member 6 of the stress controller device 5 to be located higher up inside the insulator housing 1. The higher location of the stress control member provides for a better effect. The support pipe 7 also provides for a free space below the stress control member 6 which facilitates the insertion of the cable 30 into the insulator housing and into the stress control member 6. The support pipe is made of an electrically insulating material.

The insulator housing 1 is filled with an electrically insulating gel 23, in its lower part. The insulating gel surrounds the major part of the stress controller device, but the level of insulating gel will always stay beneath the upper end 25 of stress controller device, leaving the upper part of the hollow interior 9 of the insulator housing empty in order not to obstruct the insertion of a cable 30.

The insulating gel can be of any suitable type, e.g. a polymer, a silicone gel. The insulating gel 23 may be of a type that is compressible. The stress controller device 5 and the surrounding insulating gel 23 thereby may constitute a compressible unit which allows for the cable termination device to be used for cables of different diameters. The insulating gel 23 could be of a type that can be poured into the insulator housing, normally with the insulator housing in an upright position, and that would change into a gel after it has been poured into the insulator housing 1. It should then have a consistency that will keep it firmly in place even if the cable termination device is transported lying on its side. The insulating gel should also have good adhesion capability to the internal wall of the insulator housing and also to the stress controller device, in order to completely fill out the space between the stress controller device 5 and the inner wall 12 of the insulator housing 1.

In FIG. 2 is illustrated a cable 30 with a cable termination device according to the present invention mounted at its end.

Figure 3:
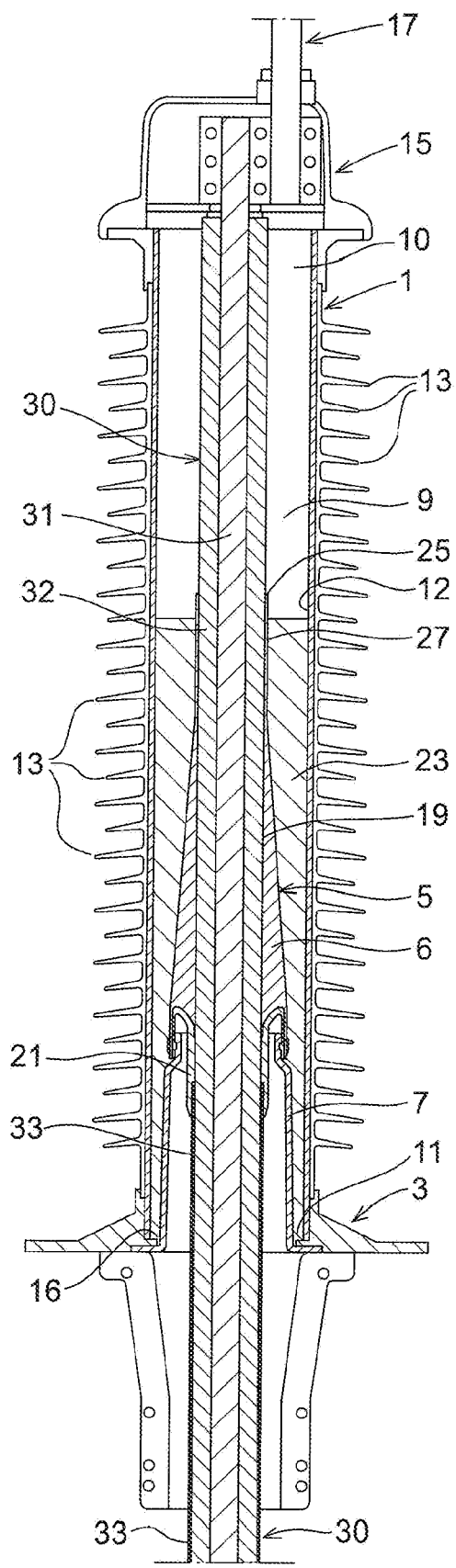
FIG. 3 shows schematically another embodiment of a cable termination device according to the present invention, partially in cross section.
Figure 4:
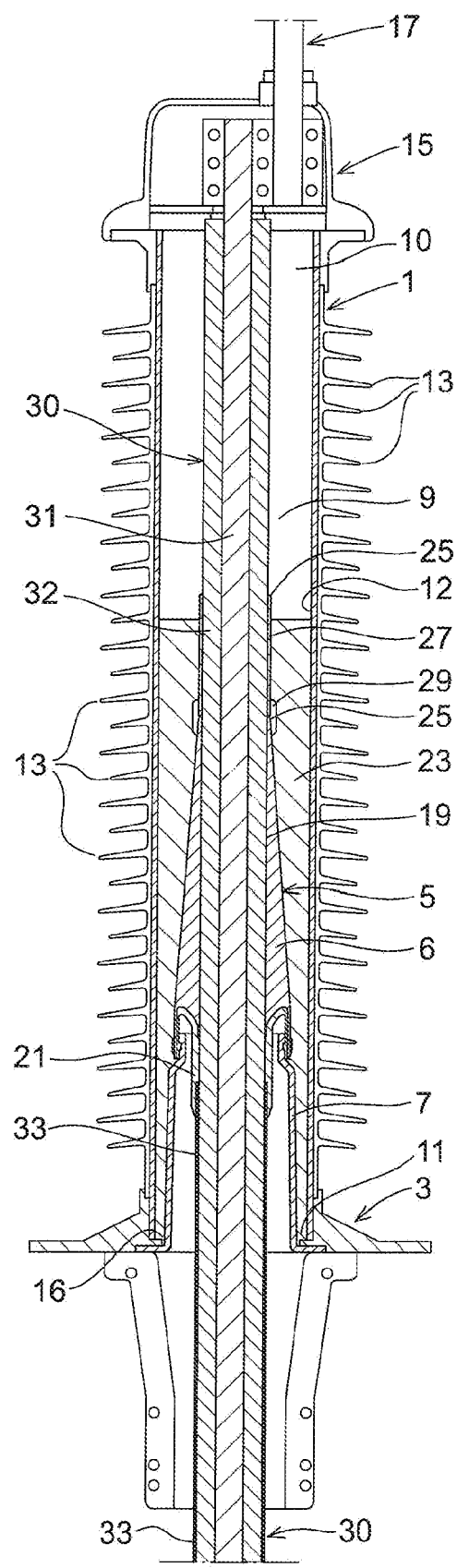
FIG. 4 shows schematically an alternative embodiment of a cable termination device according to the present invention, partially in cross section.

FIGS. 3 and 4 illustrates alternative embodiments where the stress control member 6 has been provided with an extension 27, in order to make it possible to fill more insulating gel 23 into the insulator housing 1.

In FIG. 3, the stress control member 6 has a conical shape and at its truncated upper end it is extended with a pipe-shaped extension 27. This pipe-shaped extension is made in one piece with the stress control member, and it has a free end 25 constituting the free of the stress controller device 5.

In FIG. 4, the pipe-shaped extension is made as a separate member 27 that is mounted at the upper truncated end of the conical stress control member 6 by means of a mounting device 29. The pipe-shaped extension member 27 is made of an electrically insulating material, preferably the same material as the stress control member 6. Also in this case the pipe-shaped extension member 27 has a free end 25 constituting the free end of the stress controller device 5.

According to the present invention is also offered a method involving the provision of a prefabricated cable termination device. The method for prefabricating a cable termination device comprises mounting a stress controller device 5, having a hollow interior 19 adapted for insertion of a cable 30, inside a hollow interior 9 of an insulator housing 1, by mounting the stress controller device 5 to a lower end 11 of the insulator housing, said lower end 11 having an opening for insertion of a cable 30 into the insulator housing 1 via its lower end 11, filling an electrically insulating gel 23 in liquid form into the insulator housing 1 in a space formed between the stress controller device and an inner wall 12 of the insulator housing 1, such that part of the stress controller device 5 is surrounded by insulating gel 23, and to a level where the insulating gel is below a free end 25 of the stress controller device 5 inside the insulator housing.

The manufacturing of the cable termination device would normally also include sealing the insulator housing 1 at an upper end 10 thereof. According to the invention, this may be performed as part of the prefabrication process for the cable termination device, or it may alternatively be done at the installation site when the cable termination device is installed on the cable.

Further, the prefabrication of the cable termination device may also include preparation of the stress controller device 5 by mounting the stress control member 6 on the support pipe 7 thereby forming the stress controller device 5, and mounting the stress control member 6 by means of the support pipe 7 to the insulator housing 1.

In an additional step, the method may also include mounting a pipe shaped extension member 27 on a truncated top of a conical stress control member 6, which pipe shaped extension member has a free end constituting said free end 25 of the stress controller device.

Before installation of the prefabricated cable termination device on a cable, the cable 30 should also undergo the necessary preparation for the installation, such as removal of its outer conducting or semi-conducting layer 33 at the end of the cable, and also removal of the insulating layer 32 at the outermost end of the cable thus preparing the inner conductor 31 for connection to the external electrical connection 17.

The prefabricated cable termination device is self supporting and it could be installed on the cable in a vertically upright position or at an angle to the vertical plane, up to approximately 45°. The prefabricated cable termination device is dry before and after installation, and it is ready to be used, i.e. installed on a cable, with no extra devices.

The present invention is not limited to the disclosed examples, but may be modified in many ways that would be apparent to the skilled person, within the scope of the appended claims.

What is claimed is:

1. A cable termination device of the dry type, for terminating a high voltage cable, comprising
    an insulator housing with an upper end and a lower end and having a hollow interior, which lower end has an opening for insertion of the cable,
    further comprising
    a stress controller device located inside the insulator housing and adapted to be mounted on a high voltage cable, and
    an electrically insulating gel filling at least part of the hollow interior of the insulator housing and surrounding at least part of the stress controller device,
    characterised in that
    the stress controller device is mounted at the lower end of the insulator housing and extends from the lower end of the insulator housing and into the housing where it has a free end,
    whereby a space is formed between the stress controller device and an inner wall of the insulator housing, and that said space is filled with insulating gel up to a level which is below the free end of the stress controller device inside the insulator housing.

2. The cable termination device according to claim 1, wherein the stress controller device has a length extending inside the insulator housing that is shorter than the length of the hollow interior of the insulator housing.

3. The cable termination device according to claim 1, wherein the stress controller device comprises a stress control member and a support pipe and wherein the stress control member is mounted to the insulator housing by means of the support pipe.

4. The cable termination device according to claim 1, wherein the stress controller device is provided with a deflector arrangement.

5. The cable termination device according to claim 1, wherein the stress controller device comprises a stress control member of a conical shape wherein a truncated top of the conical stress control member is provided with a pipe shaped extension, which pipe shaped extension has a free end constituting said free end of the stress controller device.

6. The cable termination device according to claim 1, wherein the stress controller device comprises a stress control member of a conical shape and that the stress controller device further comprises a pipe shaped extension member mounted on a truncated top of the conical stress control member, which pipe shaped extension member has a free end constituting said free end of the stress controller device.

7. The cable termination device according to claim 1, wherein it is self supporting.

8. The cable termination device according to claim 1, wherein the stress controller device and the surrounding electrically insulating gel forms a compressible unit which can adapt to different cable diameters.

9. The cable termination device according to claim 1, wherein it is prefabricated, before installation on the cable.

10. A method for prefabricating a cable termination device for a high voltage cable, having:
    an insulator housing, and
    a stress controller device adapted to be mounted on a high voltage cable;
    comprising the steps of:
    mounting the stress controller device, having a hollow interior adapted for insertion of a cable, inside a hollow interior of the insulator housing, by mounting the stress controller device to a lower end of the insulator housing, said lower end having an opening for insertion of a cable into the insulator housing,
    filling an electrically insulating gel into the insulator housing in a space formed between the stress controller device and an inner wall of the insulator housing, such that part of the stress controller device is surrounded by insulating gel, and to a level where the insulating gel is below a free end of the stress controller device inside the insulator housing.

11. The method according to claim 10, characterized in mounting a stress control member on a support pipe thereby forming the stress controller device, and mounting the stress control member by means of the support pipe to the insulator housing.

12. The method according to claim 10, characterised in mounting a pipe shaped extension member on a truncated top of a conical stress control member, which pipe shaped extension member has a free end constituting said free end of the stress controller device.

13. A method for achieving a cable termination on a high voltage cable, comprising
    installation of a prefabricated cable termination device of the dry type on a high voltage cable,
    the cable termination device comprising
        an insulator housing with an upper end and a lower end and having a hollow interior, which lower end has an opening for insertion of the cable,
    further comprising
        a stress controller device located inside the insulator housing and adapted to be mounted on a high voltage cable, and
        an electrically insulating gel filling at least part of the hollow interior of the insulator housing and surrounding at least part of the stress controller device, characterised in that
        the stress controller device is mounted at the lower end of the insulator housing and extends from the lower end of the insulator housing and into the housing where it has a free end,
        whereby a space is formed between the stress controller device and an inner wall of the insulator housing, and that said space is filled with insulating gel up to a level which is below the free end of the stress controller device inside the insulator housing.

* * * * *